United States Patent
Burklin et al.

(10) Patent No.: US 8,595,581 B2
(45) Date of Patent: Nov. 26, 2013

(54) DATA RECEPTION METHOD, REPAIR METHOD AND CORRESPONDING TERMINAL

(75) Inventors: Helmut Burklin, Rennes (FR); Ali Boudani, Rennes (FR); Vincent Alleaume, Pace (FR); Guillaume Bichot, La Chapelle Chausse (FR)

(73) Assignee: Thomson Licensing, Issy-les-Moulineaux (FR)

( * ) Notice: Subject to any disclaimer, the term of this patent is extended or adjusted under 35 U.S.C. 154(b) by 504 days.

(21) Appl. No.: 12/226,232

(22) PCT Filed: Apr. 4, 2007

(86) PCT No.: PCT/EP2007/053284
§ 371 (c)(1),
(2), (4) Date: Jul. 21, 2009

(87) PCT Pub. No.: WO2007/115991
PCT Pub. Date: Oct. 18, 2007

(65) Prior Publication Data
US 2009/0319849 A1    Dec. 24, 2009

(30) Foreign Application Priority Data
Apr. 11, 2006   (FR) .................................. 06 51325

(51) Int. Cl.
*H04L 1/18* (2006.01)
(52) U.S. Cl.
USPC ......................................... 714/749; 714/776
(58) Field of Classification Search
USPC ................................ 714/749, 776
See application file for complete search history.

(56) References Cited

U.S. PATENT DOCUMENTS

| 2003/0093485 A1 | 5/2003 | Dougall et al. | |
| 2005/0216472 A1* | 9/2005 | Leon et al. | 707/10 |
| 2006/0023652 A1* | 2/2006 | Vedantham et al. | 370/312 |
| 2006/0023732 A1 | 2/2006 | Vedantham et al. | |
| 2006/0064625 A1* | 3/2006 | Klein et al. | 714/776 |
| 2006/0069802 A1* | 3/2006 | Vedantham et al. | 709/233 |
| 2008/0086743 A1* | 4/2008 | Cheng et al. | 725/38 |
| 2008/0144493 A1* | 6/2008 | Yeh | 370/230 |

FOREIGN PATENT DOCUMENTS

| EP | 1555774 | 7/2005 |
| WO | WO03034747 | 4/2003 |
| WO | WO2005078982 | 8/2005 |
| WO | WO2005104421 | 11/2005 |
| WO | WO2006000936 | 1/2006 |

OTHER PUBLICATIONS

Search Report Dated Jun. 8, 2007.

* cited by examiner

*Primary Examiner* — M. Mujtaba K Chaudry
(74) *Attorney, Agent, or Firm* — Myers Wolin, LLC

(57) ABSTRACT

The invention relates to data reception, comprising:
a step of reception of a file description table,
a step of a request for transmission of at least a part of an object which has not been correctly received or has not been received, referred to as the fragment to be retransmitted, said transmission request comprising an identifier of the object to which said fragment to be retransmitted belongs and an identifier of said fragment to be retransmitted.
In order to optimize the repair of an object (for example a file) which has not been correctly received, the transmission request furthermore contains an identifier of the version of the object.

7 Claims, 9 Drawing Sheets

DATA RECEPTION METHOD, REPAIR METHOD AND CORRESPONDING TERMINAL

This application claims the benefit, under 35 U.S.C. §365 of International Application PCT/EP2007/053284 filed Apr. 4, 2007, which was published in accordance with PCT Article 21(2) on Oct. 18, 2007 in English and which claims the benefit of French patent application No. 06 51 325, filed Apr. 11, 2006.

1. DOMAIN OF THE INVENTION

The present invention relates to the domain of digital terrestrial television or digital video broadcast (DVB). More precisely, the invention relates to the broadcasting and reception of DVB services, for example DVB-H ("DVB Handheld") associated with portable terminals).

2. TECHNOLOGICAL BACKGROUND

DVB is defined in particular in the standards ETSI EN 301 192 (entitled "Digital Video Broadcasting (DVB); DVB specification for data broadcasting" and TR 101 190 (entitled "Digital Video Broadcasting (DVB); Implementation guidelines for DVB terrestrial services; Transmission aspects"). DVB-H is specified in particular in the standards ETSI EN 302 304 (entitled "Digital Video Broadcasting (DVB); Transmission System for Handheld Terminals (DVB-H)" and TR 102 377 (entitled "Digital Video Broadcasting (DVB); DVB-H Implementation Guidelines").

According to the prior art, a DVB-H television service (for example, live television or file server or VOD ("Video On Demand") server) can be downloaded in streaming mode or in file mode. A protocol known as FLUTE ("File Delivery over Unidirectional Transport") is described in the document entitled "RFC 3926, FLUTE—File Delivery over Unidirectional Transport" (by T. Paila, M. Luby, R. Lehtonen, V. Roca, R. Walsh). This protocol is used to deliver files and other discrete objects within a session. It is used in particular for the transmission of files on DVB-H. In a FLUTE session, a plurality of transport objects can be transferred; these transport objects represent, for example, files or "File Delivery Tables" (FDT). Each object is identified by its URI and its version is identified by its TOI ("Transport Object Identifier") in the form of an unsigned integer. The value 0 is reserved for an FDT, while the other values can be used for other objects. Before files are despatched, a description of these files is transmitted in an FDT according to the FLUTE protocol. For each file, the FDT associates its name (URI) with the TOI value. A description table is transmitted in the form of FDT instances, which are XML structures. Each FDT instance transports all or part of the current FDT, for example information on a subset of a file to be transmitted. Each FDT instance transports an FDT instance identifier, which is an unsigned 20-bit number. These identifiers are incremental and can therefore be used to distinguish recent instances from older instances from the same session. An FDT instance is associated with one or more files and contains an "expires" attribute, which defines an expiry time of an FDT instance. Here, the term "file" corresponds to any object transported according to the FLUTE protocol, with the exception of FDT instances. According to the FLUTE specifications, the receiver must not use a received FDT instance to interpret packets received after the FDT instance expiry time.

FIG. 1 shows schematically a file distribution service broadcast in a DVB-CBMS ("Convergence of Broadcast and Mobile Services") context (or DVB specified in the transfer of IP ("Internet Protocol") data on DVB-H: "IP Datacast over DVB-H protocol: Content Delivery Protocols (CDP)"). A file server 100 broadcasts a first FDT 110 which is transmitted via the FLUTE protocol over IP on a DVB-H network to a terminal 101. The first FDT 110 comprises a URI ("Uniform Resource Identifier") which enables identification of the file (and more generally the object) which is to be transmitted. The terminal receives the first FDT and records the description of the file which is to be broadcast according to this first FDT. The file server 100 then broadcasts data in the form of one or more symbols corresponding to parts of files in the form of successive frames 111 to 113 to the terminal 101 via the DVB-H network. By way of illustration, it is assumed that the file server 100 broadcasts a second FDT 120 with the same URI to the terminal 101 in the same time interval as the terminal 101 transmits a message 114 (via an Internet channel uplink, for example) to the file server 100. According to a different scenario, the message 114 is transmitted if the second FDT 120 is not correctly received or is not received by the terminal (which may result in system malfunctions). The message 114 contains the URI corresponding to the two FDTs and an identifier of the fragment to be retransmitted. It enables the terminal 101 to request one or more symbols which have not been correctly received or have not been received (or fragments) from the file server 100 via DVB-H. The second FDT 120 does not have to be received by the terminal 101. On receiving the message 114 relating to the first FDT, the server 100 forwards a frame 121 comprising symbols which have the same identifier as the requested symbols, but which correspond to the second FDT and not to the first FDT. The disadvantage of this technique is therefore that it generates the transmission of errored symbols, which may result in terminal malfunctions.

3. SUMMARY OF THE INVENTION

The object of the invention is to overcome these disadvantages of the prior art.

More specifically, the object of the invention is to improve the repair of objects (for example image or file objects) which have not been correctly received or have not been received by a recipient.

To achieve this object, the invention proposes a data reception method comprising:
  a step of reception of a file description table,
  a step of request for transmission of at least a part of an object (for example an image or data file object) which has not been correctly received or has not been received, referred to as a fragment to be retransmitted, said transmission request comprising an identifier of the object to which the fragment to be retransmitted belongs and an identifier of the fragment(s) to be retransmitted.

In order to improve the repair of objects which have not been correctly received or have not been received in full or in part, according to the invention, the transmission request comprises, inter alia, an identifier of the object version.

According to a particular characteristic, the object comprises audio and/or video data.

Advantageously, the transmission request is transmitted to a repair server.

According to an advantageous characteristic, the transmission request is transmitted according to an HTTP protocol.

According to a particular characteristic, the file description table is transmitted over a digital terrestrial network.

According to an advantageous characteristic, the method comprises a step of reception of an error message if the identifier of the object version is obsolete.

The invention also relates to a data repair method, comprising:
  a step of reception of a request for transmission of at least a part of an object which has not been correctly received or has not been received, said transmission request comprising an identifier of the object to which the fragment to be retransmitted belongs and an identifier of the fragment to be retransmitted.

According to the invention, the method comprises a step of transmission of a message comprising an identifier of the object version and at least a part of the fragment(s) to be retransmitted.

The invention also relates to a data reception terminal, comprising:
  means for receiving a file description table,
  means for requesting transmission of at least a part of an object which has not been correctly received or has not been received, referred to as the fragment to be retransmitted, said transmission request comprising an identifier of the object to which the fragment(s) to be retransmitted belong(s) and an identifier of the fragment(s) to be retransmitted.

According to the invention, the terminal comprises means for inserting an identifier of the object version into the transmission request.

4. LIST OF FIGURES

The invention will be more readily understood and other features and advantages will become evident from reading the description which follows, referring also to the attached drawings, in which.

Figure 1:
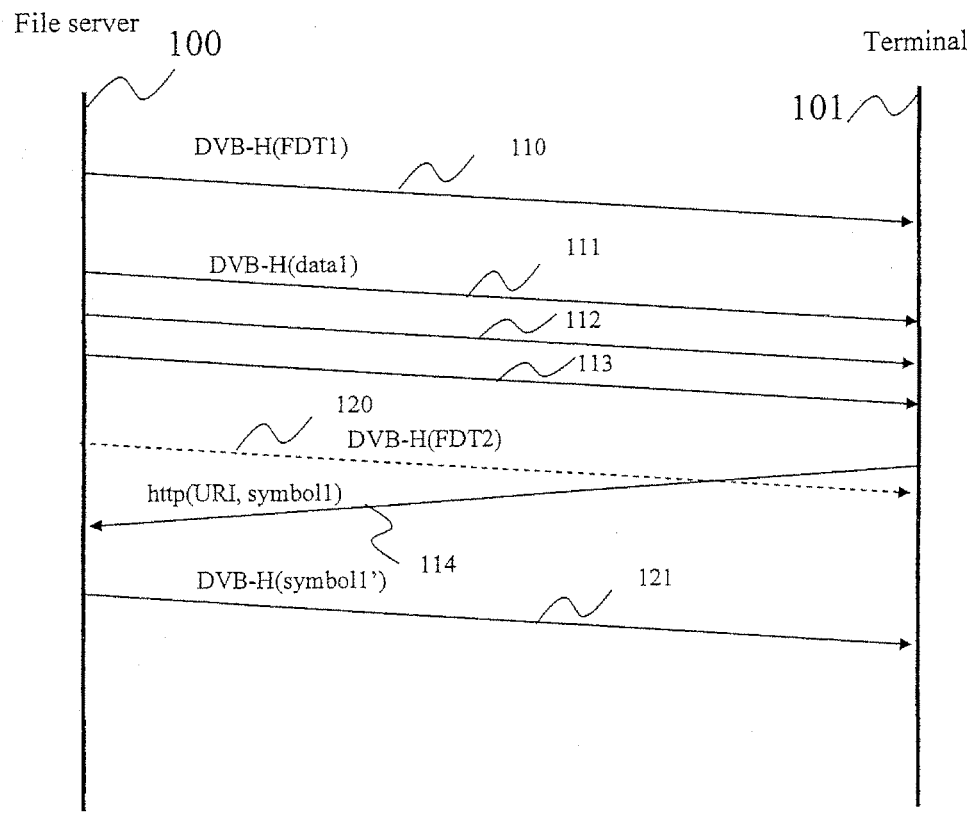
FIG. 1 shows a communication protocol for communication between a server and a terminal according to the prior art.
Figure 2:
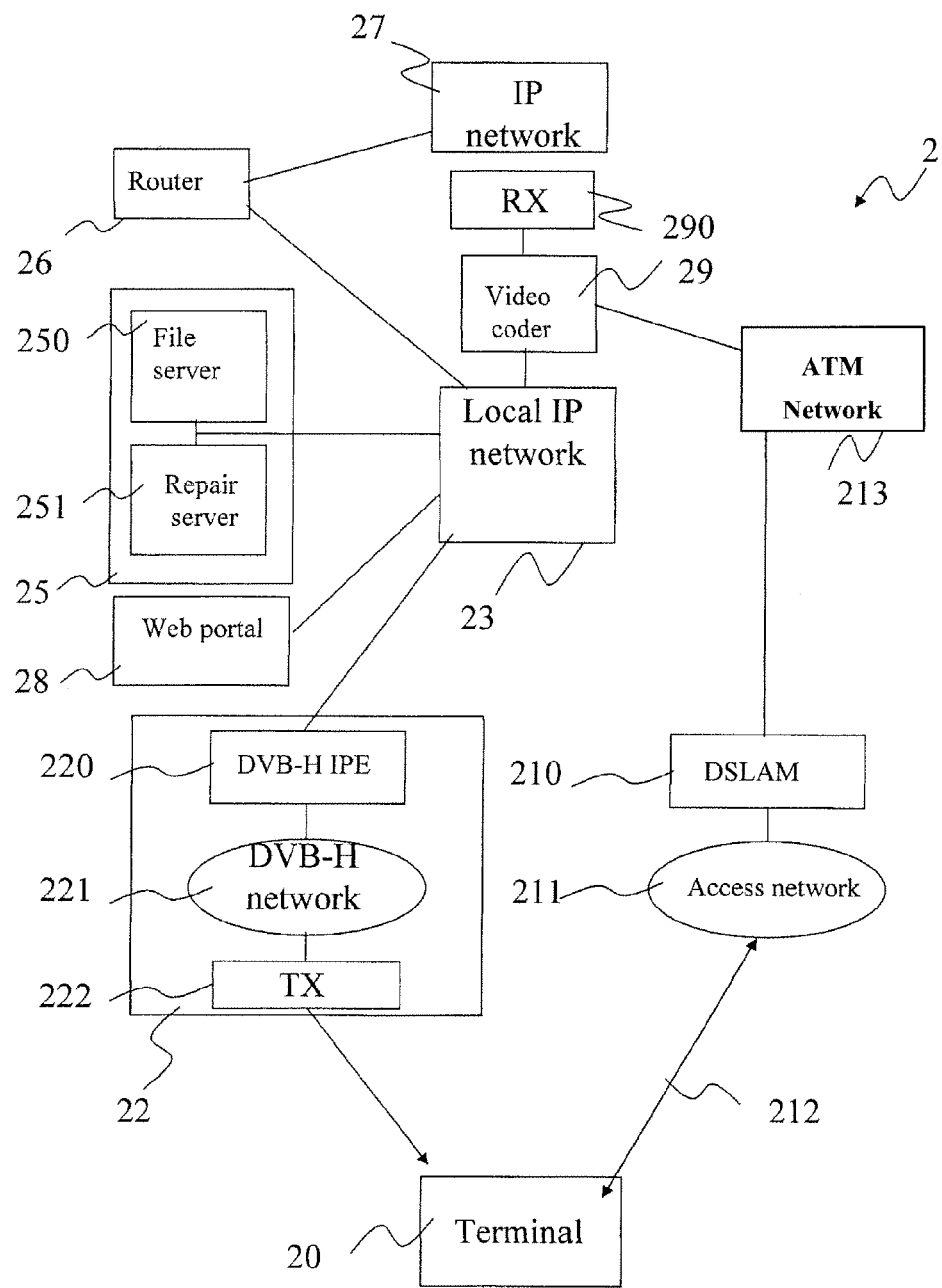
FIG. 2 is a highly schematic summary of a DVB-H network implementing the invention.
Figure 3:
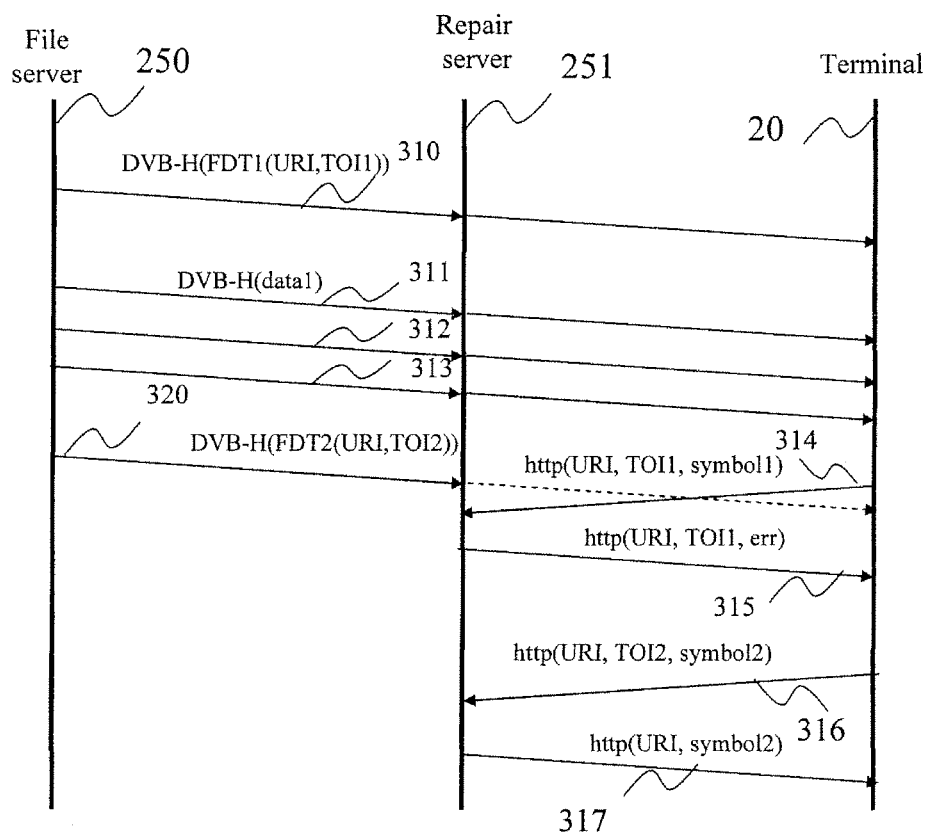
Figure 4:
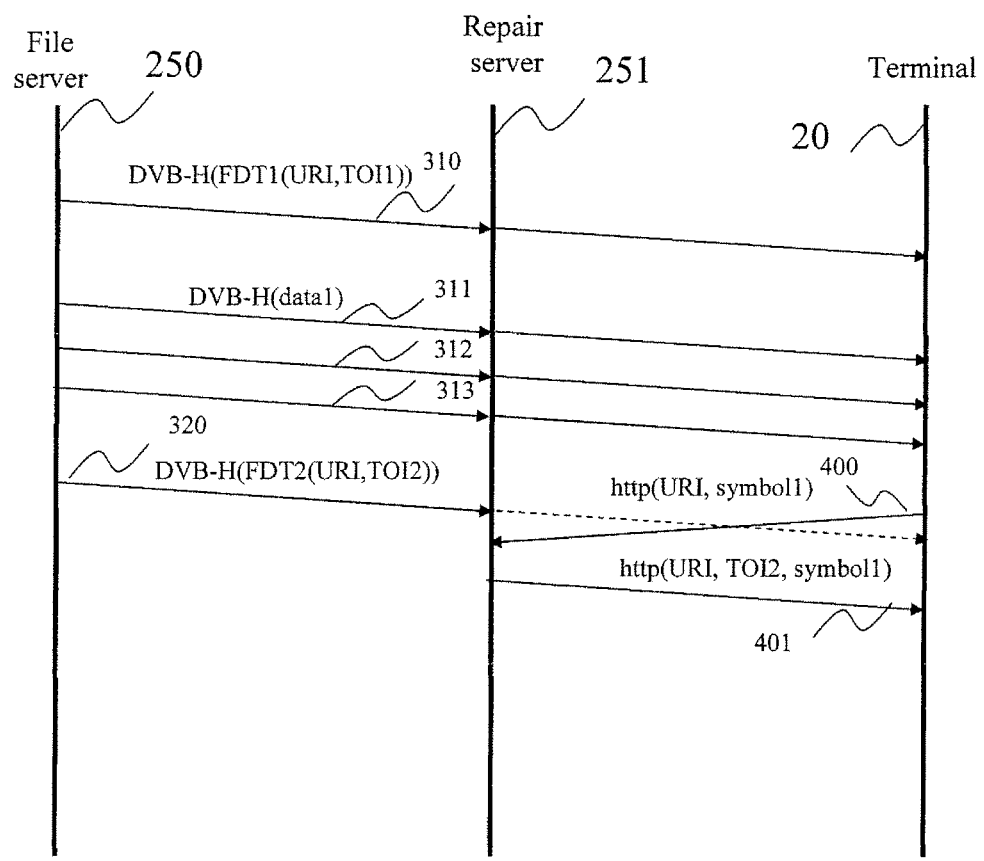
Figure 5:
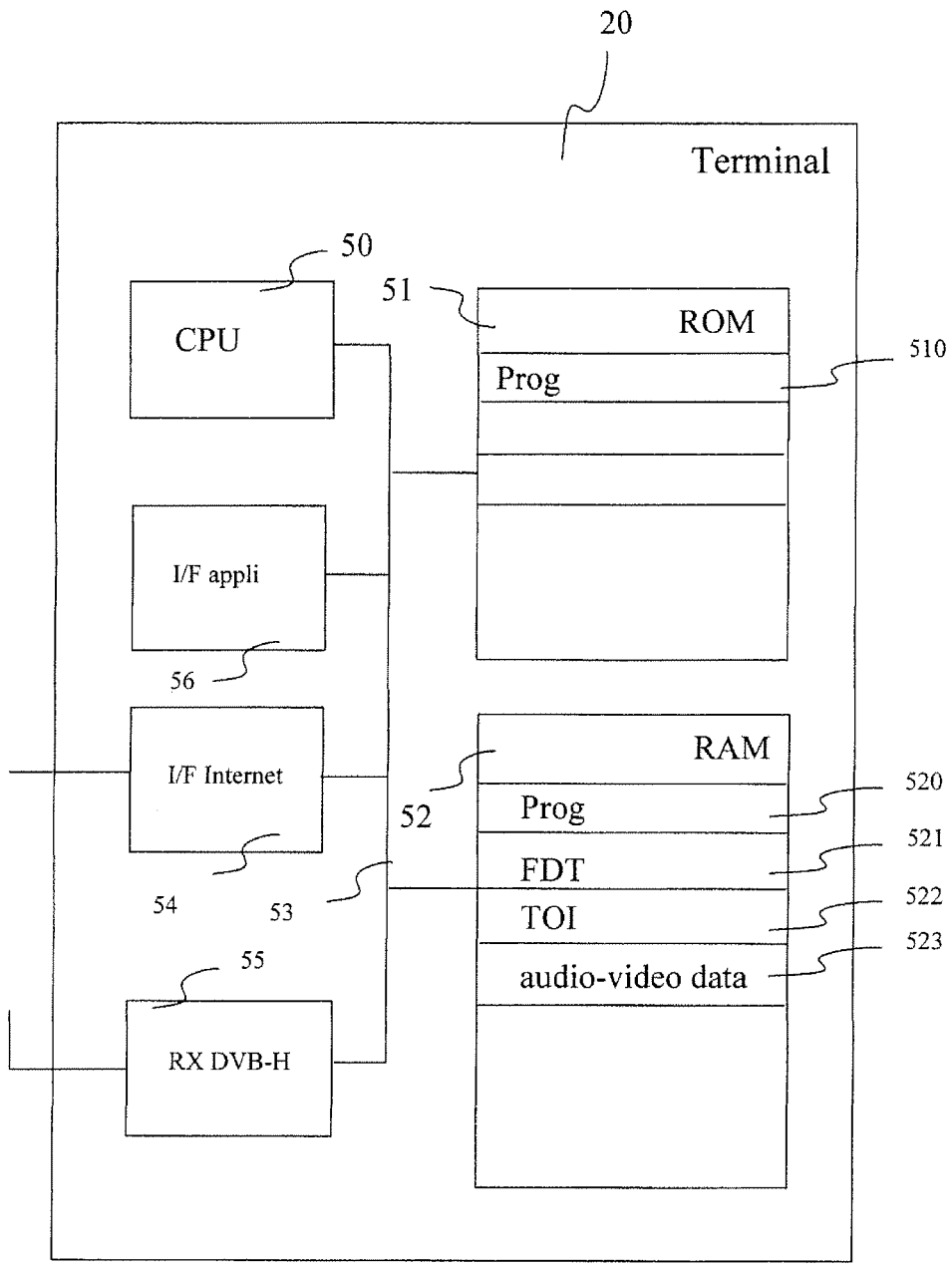
Figure 6:
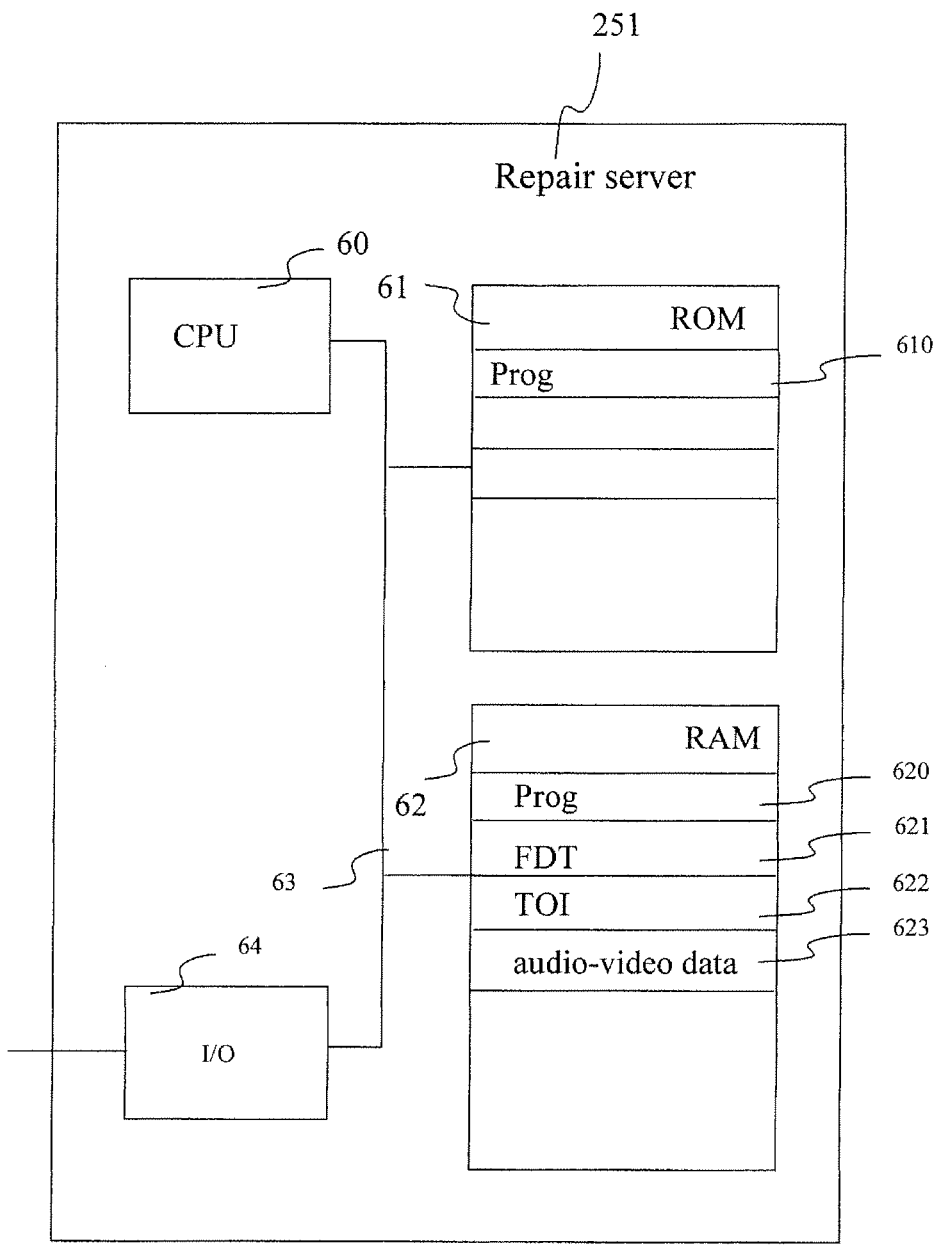
Figure 7:
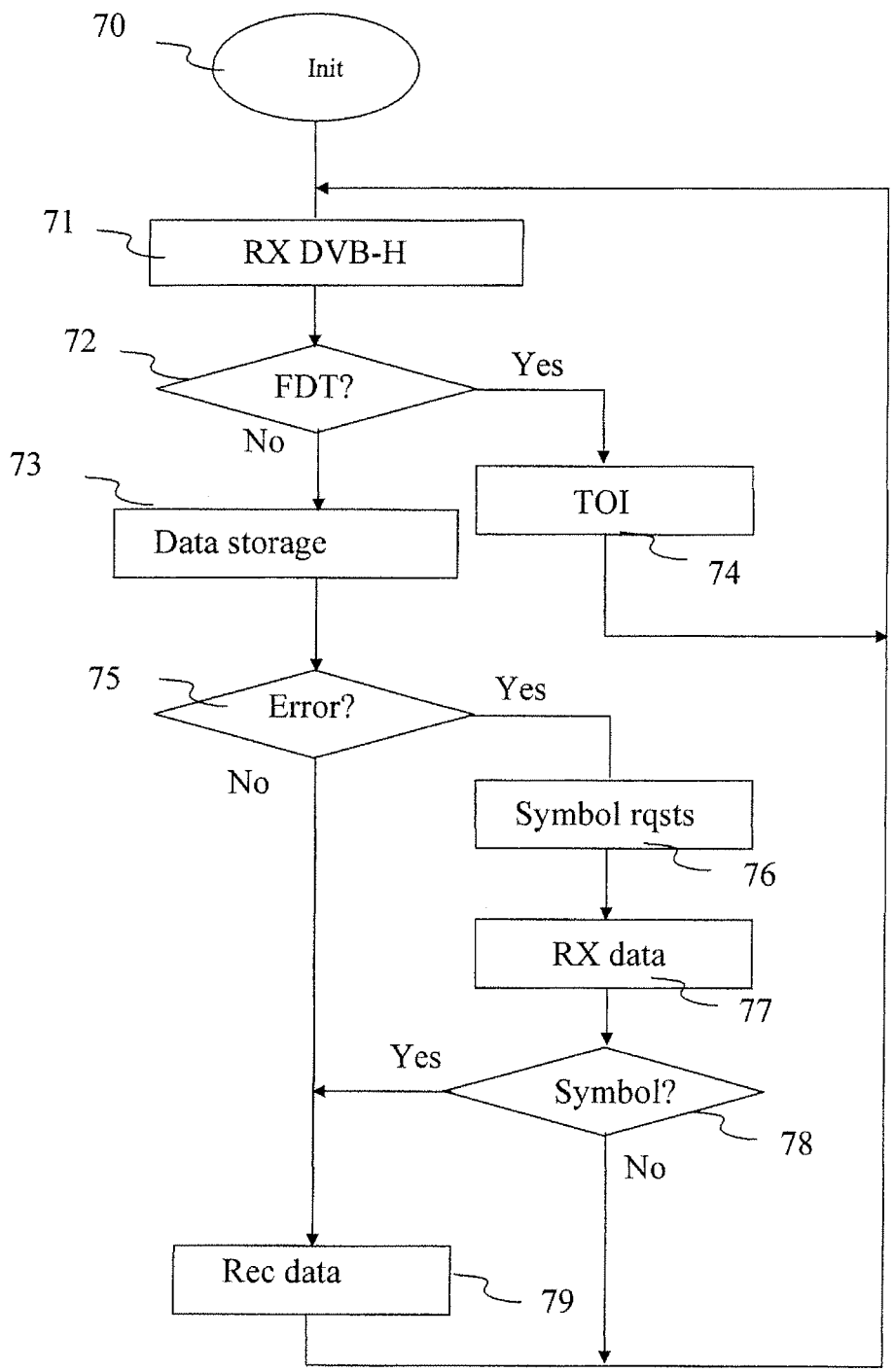

FIGS. 3 and 4 present a communication protocol for communication between servers and a terminal of the network shown in FIG. 2, according to two embodiments of the invention;

FIG. 5 shows a terminal of the network shown in FIG. 2;

FIG. 6 shows a repair server implemented in the network shown in FIG. 2;

FIG. 7 shows an algorithm implemented in the terminal shown in FIG. 5; and

Figure 8:
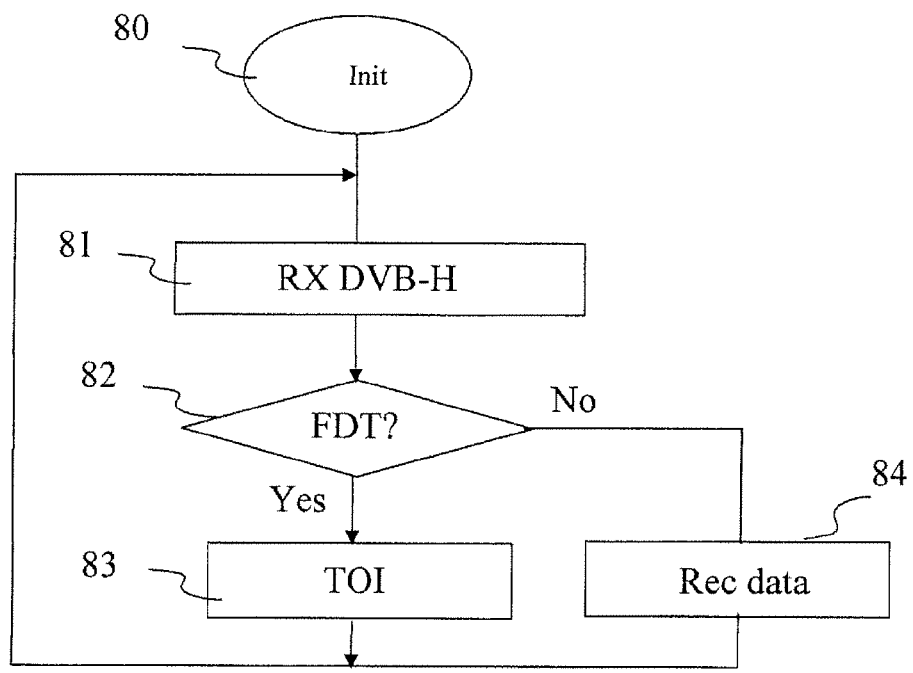
Figure 9:
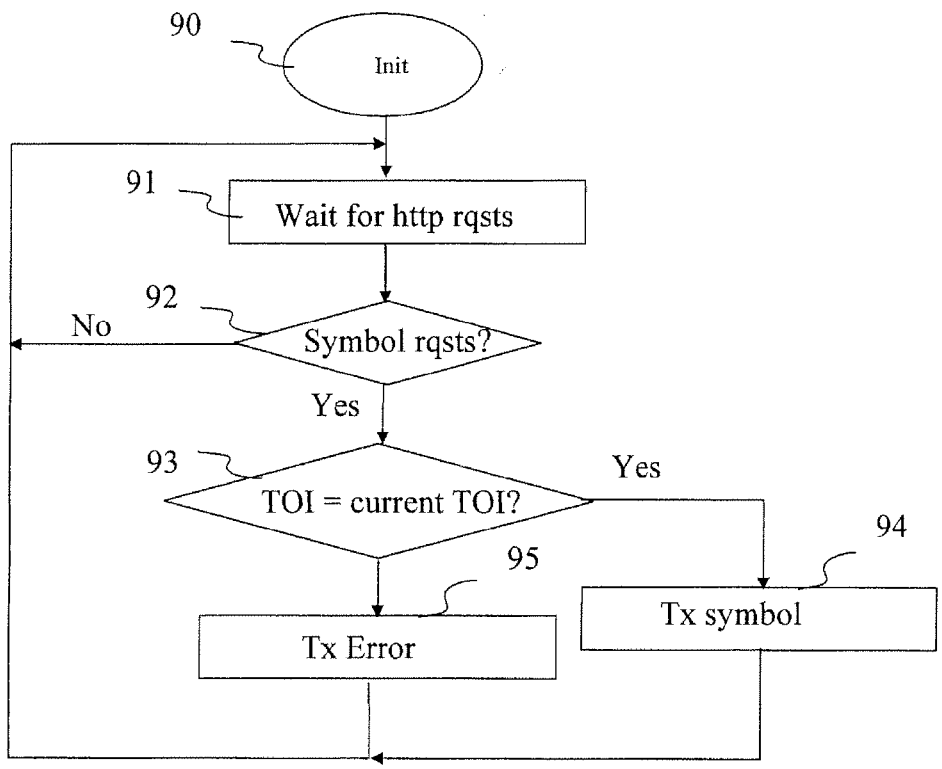
Figure 10:
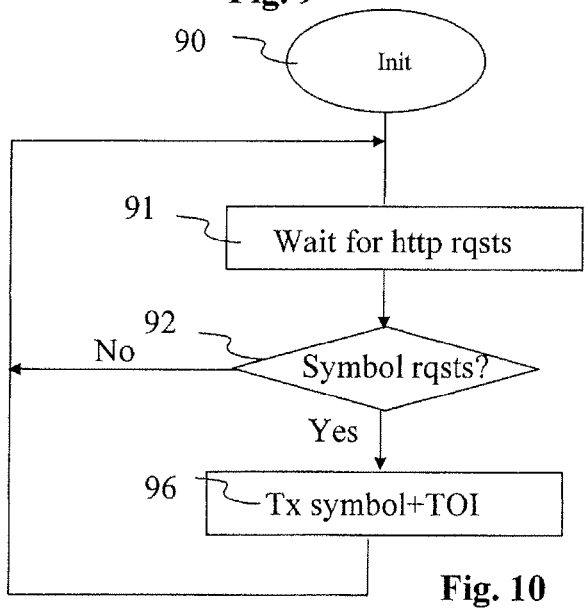

FIGS. 8 to 10 show algorithms implemented in the repair server shown in FIG. 6.

5. DETAILED DESCRIPTION OF THE INVENTION

FIG. 2 shows a schematic summary of an infrastructure of a network 2 implementing a particular embodiment of the invention with an infrastructure combining DVB-H and xDSL ("x-Digital Subscriber Line") elements. This network enables in particular the broadcasting of files in file mode in a DVB-CBMS context.

The infrastructure of the network 2 comprises in particular:
  an IP network backbone 23 belonging to the service provider, which interconnects the elements of the service provider;
  an IP network backbone 27 which enables the connection of an ADSL network to the IP network 23;
  a video coder 29 which receives data from a receiver 290;
  a server 25 comprising a file server 250 and a repair server 251;
  a web portal (which is an http/html or wap server enabling an interaction with the DVB-H service provider) 28;
  a DVB-H network 22;
  an IP router 26 which enables interconnection of the IP networks 23 and 27;
  a broadband network (for example an ATM network) 213;
  a DSLAM module 210;
  an access point 211; and
  a terminal 20, preferably a mobile terminal and, for example, a PDA or mobile telephone.

The server 25 may be a single block (the servers 250 and 251 being implemented in the same machine) or in the form of separate blocks (the servers 250 and 251 being, for example, separated). According to variants of the invention, a file server may be associated with a plurality of repair servers and/or a repair server may be associated with a plurality of file servers. According to variants of the invention, the file server(s) may be connected locally to one or more repair servers or via a remote link (for example an Internet link).

The portal 28 and the servers 250 and 251 are connected to the network 23. The file server 250 transmits DVB-H services to the terminal 20 via the DVB-H network 22.

The DVB-H network 22 comprises in particular:
  an IP encapsulation module 220 (IPE) of the DVB-H type;
  a DVB-H network core 221; and
  a transmitter 222.

The file server 250 broadcasts audio/video files via the network 22 to the DVB terminals and in particular to the terminal 20. The repair server also receives these files, which it stores for a predetermined time, and/or until a particular event occurs and/or until its storage capacities are used up. It can therefore retransmit all or some of the files not correctly received by a terminal over the DVB network 22 and/or via the network 211.

According to one implementation variant, the uplink between the terminal and the repair server (and possibly the file servers) is established via a cellular network which comprises, for example, a GGSN cellular network gateway, a network core and a base station. In this case, the terminal comprises a transmitter/receiver enabling communications with the cellular network. The cellular network is, for example, a 3G (i.e. a third-generation) or a GSM network. It is preferably a high-speed network in the downlink direction (network core to terminal) to enable the transfer of audio/video data.

FIG. 5 shows schematically the terminal 20.

The terminal 20 comprises, interconnected by an address and data bus 53:
  a microprocessor 50 (or CPU);
  a non-volatile ROM memory ("Read Only Memory") 51;
  a RAM memory ("Random Access Memory") 52;
  an Internet interface 54 enabling the reception and transmission of Internet data (for example data transmitted and/or received via the network 211);
  a reception module 55 to receive the signal received over the DVB-H network; and
  an interface 56 which transmits the received images to the audio/video application (for example for display or recording).

Moreover, each of the elements shown in FIG. 5 is well known to the person skilled in the art. These common elements are not described here.

It will be noted that the word "register" used in the description designates, in each of the memories mentioned, not only a low-capacity memory zone (a few binary data) but also a high-capacity memory zone (enabling storage of an entire program or all or part of the data representing a received audio/video service).

The ROM memory 51 comprises in particular:
a program "prog" 510.

The algorithms implementing the steps of the method described above are stored in the ROM memory 51 associated with the terminal 20 implementing these steps. When booted up, the microprocessor 50 loads and performs the instructions of these algorithms.

The RAM memory 52 comprises in particular:
in a register 520, the operating program of the microprocessor 50 loaded when the terminal 20 is booted up;
the content of a received FDT table in a register 521;
the current TOI field in a register 522; and
audio/video data corresponding to one or more received files.

FIG. 6 shows schematically the repair server 251.

The server 251 comprises, interconnected by an address and data bus 63:
a microprocessor 60 (or CPU);
a non-volatile ROM memory 61;
a RAM memory 62; and
an Internet interface 64 enabling reception and transmission of Internet data (for example data transmitted to the terminal 20 and/or received from the server 250 or from the terminal 20).

Moreover, each of the elements shown in FIG. 6 is well known to the person skilled in the art. These common elements are not described here.

The ROM memory 61 comprises in particular:
a program "prog" 610.

The algorithms implementing the steps of the method described above are stored in the ROM memory 61 associated with the server 251 implementing these steps. When booted up, the microprocessor 60 loads and performs the instructions of these algorithms.

The RAM memory 62 comprises in particular:
in a register 620, the operating program of the microprocessor 60 loaded when the server 251 is booted up;
the content of a received FDT table in a register 621;
the current TOI field in a register 622; and
audio/video data corresponding to one or more received files.

FIG. 3 shows schematically a file service broadcast in file mode according to the invention. A file server 250 broadcasts a first FDT 310 which is transmitted via the FLUTE protocol over a DVB-H network to a terminal 20. The first FDT 310 comprises a URI (for example a name) which enables identification of the object (for example a file, image or binary data set) which is to be transmitted. The first FDT 310 also comprises a TOI ("Transport Object Identifier"). The TOI is, for example, a TOI according to the specifications of the FLUTE protocol or any other identifier (for example digital) of a version of the object to be transmitted. The TOI thus enables identification of the version of the object to be transmitted. The terminal 20 receives the first FDT 310 and records the description of the object which is to be broadcast according to this first FDT, the URI and the TOI. The file server 250 then broadcasts data in the form of one or more symbols (or fragments) corresponding to parts of the object (corresponding to the first FDT) in the form of successive frames 311 to 313, to the terminal 20 via the DVB-H network. By way of illustration, according to a first scenario, it is assumed that the file server 250 broadcasts a second FDT 320 with the same URI as the first FDT and a different TOI (there is a change of version of the transmitted object; this entails, for example, an image which has been updated) to the terminal 20 in the same time interval as the terminal 20 transmits a message 314 to the repair server 251 (via an uplink channel, for example an Internet channel). According to a second scenario, the file server 250 has transmitted the message 320 which was not (or not correctly) received by the terminal 20. The message 314 contains the URI corresponding to the two FDTs, an identifier of the fragment(s) to be retransmitted and the TOI corresponding to the first FDT. It enables the terminal 20 to request one or more symbols not received or not correctly received (or fragments) from the repair server 251 via DVB-H. The second FDT 320 does not have to be received by the terminal 20. On receiving the message 314 containing a TOI associated with the first FDT, after verifying the current TOI, the server 251 forwards an error frame 315 indicating to the terminal that the required fragment(s) belong(s) to an obsolete version of the object corresponding to the current URI. It is then assumed that the terminal 20 has recorded the TOI corresponding to the second FDT 320 and forwards a message 316 to the repair server 251 containing the current URI, an identifier of the fragment(s) to be retransmitted and the TOI corresponding to the second FDT. The server 251 checks whether the TOI of the request message 316 is the current TOI and transmits an http message 317 ("HyperText Transfer Protocol", defined by the RFC2616 or RFC2818 standard, in a version secured with authentication) comprising the required fragment(s) to the terminal 20. According to one variant, the repair server 251 transmits the required fragment(s) via the DVB-H network to the terminal 20 in a new FLUTE session or an existing FLUTE session (the http message 317 not having been transmitted). According to a different variant enabling more economical use of the memory of the server 251 (whereby the latter does not then need to store the audio/video data), the repair server 251 requests the file server 250 to transmit the required fragments via the DVB-H network.

FIG. 4 shows schematically a variant of the file service broadcast in file mode according to the invention. According to this variant, the transmission of the messages 310 to 313 and 320 is similar to that described in relation to FIG. 3.

By way of illustration, it is assumed that the file server 250 broadcasts a second FDT 320 with the same URI as the first FDT and a different TOI to the terminal 20 in the same time interval as the terminal 20 transmits a message 400 to the repair server 251 (via an uplink channel, for example an Internet channel). The message 400 contains the URI corresponding to the two FDTs and an identifier of the fragment(s) to be retransmitted. It enables the terminal 20 to request one or more symbols not received or not correctly received (or fragments) from the file server 250 via DVB-H. The second FDT 320 does not have to be received by the terminal 20. On receiving the message 400, the server 251 forwards an http message 401 containing the required fragment(s), the TOI and the current URI. The terminal 20 then checks whether the URI and the TOI contained in the message 401 correspond to the symbols required in the message 400. If not, the terminal ignores the message 401. If so, the URI and TOI in the message 401 correspond to the required fragment(s) and the fragment(s) of the message 401 can be recorded.

FIG. 7 shows an audio/video data reception method implemented in the form of an algorithm which processes the objects received by the terminal 20 and transmitted by one of servers 250 and 251. This algorithm is implemented in the terminal 20 (for example by the CPU 50, whereby the algorithm corresponds to a task of the program 510).

The method begins with an initialization step 70, during which the different variables and parameters are updated. During this step, the terminal 20 identifies the file server 250 which transmits a list of repair servers to it, including the server 251, which the terminal has, for example, selected.

Then, during a step 71, the terminal 20 waits for then receives a frame or a message from the DVB-H network 22.

Then, during a test 72, the terminal 20 checks whether the received frame contains an FDT.

If so, during a step 74, the terminal 20 extracts the TOI from it and stores it in the register 522. Following the step 74, the step 71 is reiterated.

If not, during a step 73, the terminal 20 stores the fragments of the object corresponding to the stored FDT which have been correctly received (the integrity of the received data can be checked using, for example, an error detection code).

Then, during a test 75, the terminal 73 checks whether all the fragments of the object corresponding to the last stored FDT have been correctly received: certain fragments may not have been received or may not have been correctly received. The test 75 is preferably implemented when the end of reception of the transmitted object is detected or following the timeout indicated in the FDT.

If fragments of the object have not been correctly received, during a step 76, (following a possible pause for a predefined time serving as a safety margin ("back-off time"), the terminal 20 transmits a request corresponding to the previously described message 314 or 400 to the repair server 251.

Then, during a step 77, the terminal 20 receives a message from the repair server 251 (or from the file server 250 according to one variant) in response to the request from the step 76. This may entail, in particular, a message 315, 317 or 401.

Then, during a test 78, the terminal 20 checks whether the received message contains the received symbols. According to the variant shown in FIG. 4, the terminal 20 furthermore checks whether the TOI present in the message 401 is in fact the message corresponding to the current TOI stored in the register 522, which corresponds to the request transmitted in the step 76.

If so, the received symbols are valid and are recorded by the terminal during a step 79.

If not, an error message being received or the received symbols not being associated with the current TOI, or following the step 79, the step 71 is reiterated.

FIG. 8 shows a data reception method implemented in the form of an algorithm, the data being received by the repair server 251 and being transmitted by the file server 250. This algorithm is implemented in the repair server 251 (for example by the CPU 60, whereby the algorithm corresponds to a task of the program 610).

The method begins with an initialization step 80, during which the different variables and parameters are updated.

Then, during a step 81, the server 251 waits for then receives data from the server 250.

Then, during a test 82, the server 251 checks whether the data contain an FDT.

If so, during a step 83, the server 251 records the TOI associated with the received FDT in the register 622 and also the URI.

If not, during a step 84, the server 251 stores the data in the register 623.

Following the steps 83 and 84, the step 81 is reiterated.

In one embodiment of the invention, according to which the server 251 requests the server 250 to transmit fragments to a terminal which requests them, the steps 84 may be omitted or reduced.

FIG. 9 shows a method for repairing or processing repair requests implemented in the form of an algorithm by the repair server 251 (for example by the CPU 60, whereby the algorithm corresponds to a task of the program 610). This algorithm corresponds to the exchanges shown in FIG. 3.

The method begins with an initialization step 90, during which the different variables and parameters are updated.

Then, during a step 91, the server 251 waits for then receives an http message (for example message 314 or 316) from the terminal 20.

Then, during a test 92, the server 251 checks whether the received http message corresponds to a request for transmission of one or more object fragments previously transmitted via the file server 250 (of the request type 310).

Then, during a test 93, the server 251 extracts the TOI inserted in the received request and checks whether this TOI corresponds to the current TOI (stored in the register 622).

If so, the server 251 transmits the required fragment (s) during a step 94 (message 317). According to one variant, the server 251 requests the file server 253 to retransmit the required fragment(s) to the terminal or to broadcast them on the DVB-H network.

If not, the server 251 transmits an error message (message type 315) during a step 95. Thus, if the required fragments are obsolete, the implementation on the terminal side is simplified and data are not transmitted unnecessarily to the terminal 20.

The step 91 is reiterated following the steps 94 or 95.

FIG. 10 shows a method for repairing or processing repair requests implemented in the form of an algorithm by the repair server 251 (for example by the CPU 60, whereby the algorithm corresponds to a task of the program 610). This algorithm corresponds to the exchanges shown in FIG. 4.

The method begins with an initialization step 90, during which the different variables and parameters are updated.

Then, during a step 91, the server 251 waits for then receives an http message (for example message 400) from the terminal 20.

Then, during a test 92, the server 251 checks whether the received http message corresponds to a request for the transmission of one or more object fragments previously transmitted via the file server 250 (request type 310).

Then, during a test 96, the server 251 transmits the fragment(s) which correspond to the URI and to the identifier of fragments to be transmitted present in the request received in a message (type 401) which also contains the TOI stored in the register 622. Thus, the verification of the TOI must be carried out by the terminal 20, thereby simplifying the implementation in the server 251. The step 91 is then reiterated.

The invention is, of course, not limited to the embodiments described above.

In particular, the invention is not limited to an implementation in a DVB-H network, but also relates to any transmission of objects (for example any type of image, sound and/or data files) in the form of one or more fragments to a terminal, the versions of which may change.

The invention is particularly well adapted to the transmission of fragments on a noisy or rapidly changing channel (for example a wireless link).

Moreover, the uplink (i.e. from a terminal) is not necessarily of the Internet or mobile type, but may be of any type (for example a switched network, dedicated network, etc.).

Furthermore, the architecture of the network connecting an object server to terminals is, according to the invention, of any given type enabling the broadcasting of objects to one or more terminals.

Moreover, the objects are not necessarily of the audio/video file type but, according to the invention, may be of any type (for example sound or images not inserted in a file, non-audio and non-video, etc.).

According to the invention, the object version identifier is not necessarily an identifier as defined in the DVB standard, but may be any type of identifier (for example a predefined number).

The invention claimed is:

1. Data reception method implemented by a receiver, wherein the method comprises:
   receiving a file description table comprising an identifier enabling identification of an object, referred to as uniform resource identifier, and information enabling identification of a first version of said object,
   sending a first request for transmission of at least a part of said object which has not been correctly received or has not been received, said at least a part further being referred to as fragment to be retransmitted, said first request for transmission comprising said uniform resource identifier of the object to which said fragment to be retransmitted belongs, an identifier of said fragment to be retransmitted, referred to as fragment identifier, and said information enabling identification of the first version of said object,
   receiving an error message indicating that said fragment to be retransmitted belongs to an obsolete version of said object,
   sending a second request for transmission of said fragment to be retransmitted, said second request for transmission comprising said uniform resource identifier of the object to which said fragment to be retransmitted belongs, said fragment identifier, and information enabling identification of a second version of said object, and
   receiving a message comprising said fragment to be retransmitted belonging to said second version of said object.

2. Method according to claim 1, wherein said object comprises audio or video data.

3. Method according to claim 1, wherein the first and the second request for transmission are transmitted to a repair server.

4. Method according to claim 1, wherein said first and the second request for transmission are transmitted according to an HTTP protocol.

5. Method according to claim 1, wherein said file description table is transmitted over a digital terrestrial network.

6. Data repair method implemented by a server, wherein the method comprises:
   sending a file description table comprising an identifier enabling identification of an object, referred to as uniform resource identifier, and information enabling identification of a first version of said object,
   receiving a first request for transmission of at least a part of said object which has not been correctly received or has not been received, said at least a part further being referred to as fragment to be retransmitted, said first request for transmission comprising said uniform resource identifier of the object to which said fragment to be retransmitted belongs, an identifier of said fragment to be retransmitted, referred to as fragment identifier, and said information enabling identification of the first version of said object,
   transmitting an error message indicating that said fragment to be retransmitted belongs to an obsolete version of said object,
   receiving a second request for transmission of said fragment to be retransmitted, said second request for transmission comprising said uniform resource identifier of the object to which said fragment to be retransmitted belongs, said fragment identifier, and information enabling identification of a second version of said object, and
   sending a message comprising said fragment to be retransmitted belonging to the second version of said object.

7. Data reception terminal, wherein the data reception terminal comprises:
   a receiver for receiving a file description table comprising an identifier enabling identification of an object, referred to as uniform resource identifier, and information enabling identification of a first version of said object,
   a transmitter for sending a first request for transmission of at least a part of said object which has not been correctly received or has not been received, said at least a part further being referred to as fragment to be retransmitted, said first request for transmission comprising said uniform resource identifier of the object to which said fragment to be retransmitted belongs, an identifier of said fragment to be retransmitted, referred to as fragment identifier, and said information enabling identification of the first version of said object,
   a receiver for reception of an error message indicating that said fragment to be retransmitted belongs to an obsolete version of said object,
   a transmitter for sending a second request for transmission of said fragment to be retransmitted, said second request for transmission comprising said uniform resource identifier of the object to which said fragment to be retransmitted belongs, said fragment identifier, and information enabling identification of a second version of said object, and
   a receiver for receiving a message comprising said fragment to be retransmitted belonging to the second version of said object.

* * * * *